United States Patent Office 3,850,965
Patented Nov. 26, 1974

3,850,965
METHOD FOR MAKING AROMATIC ETHER ANHYDRIDES AND PRODUCTS MADE THEREBY
Frank J. Williams III, Scotia, N.Y., assignor to General Electric Company
No Drawing. Filed Mar. 30, 1973, Ser. No. 346,472
Int. Cl. C07d 7/18
U.S. Cl. 260—345.2   19 Claims

ABSTRACT OF THE DISCLOSURE

A method is provided for making aromatic ether anhydrides and aromatic thioether anhydrides and to products made thereby. Reaction is effected between an alkali phenoxide or thiophenoxide and certain nitro- or halo-substituted aromatic anhydrides. The aromatic ether anhydrides can be used as anti-oxidants for hydrocarbon greases and plasticizers for organic resins.

---

The present invention relates to a method for making an aromatic ether or thioether anhydride. More particularly, a nitro- or halo-substituted aromatic anhydride is reacted with an alkali phenoxide or alkali thiophenoxide.

The aromatic ether anhydrides of the present invention are included by the following formulas, (I) 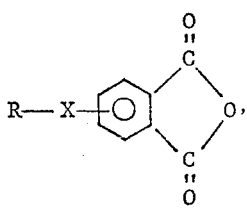

(II) 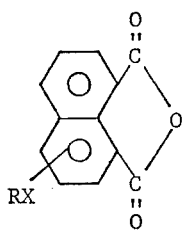

where R is an aromatic radical having from 6–13 carbon atoms, and X is a divalent radical selected from —S— and —O—.

R of formulas I and II is more particularly phenyl, tolyl, xylyl, naphthyl, anthryl; halogenated derivatives thereof such as chlorophenyl, bromotolyl, etc.

There is also provided by the present invention, a method for making aromatic ether anhydrides of formulas I and II, which comprises (1) Effecting reaction between an alkali metal phenoxide of the formula (III)    R—X—M, and a nitro- or halo-substituted aromatic anhydride selected from compounds of the formulas, (IV) 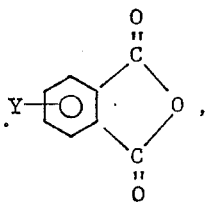

(V) 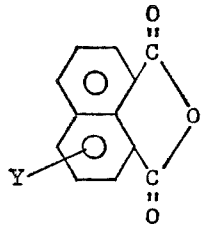

where Y can be nitro, fluoro, chloro, bromo or iodo, (2) And recovering from the resulting mixture of (1), an aromatic ether anhydride, where M is an ion of an alkali metal selected from sodium, potassium, lithium and rubidium, and R and X are as previously defined.

Included by the aromatic ether anhydride of formula I are compounds such as 3-phenoxyphthalic anhydride, 4-phenyoxyphthalic anhydride, 3-thiophenoxyphthalic anhydride, 4-thiophenoxyphthalic anhydride, 3-(4'-chloro)phenoxyphthalic anhydride, 4-(4'-hydroxy)thiophenoxyphthalic anhydride, etc.

Compounds included by formula II are, for example, 4-phenoxynaphthalic anhydride, 2-phenoxynaphthalic anhydride, 4-thiophenoxynaphthalic anhydride, 4-(4'-chloro)phenoxynaphthalic anhydride, 2- (4' - hydroxy)thiophenoxynaphthalic anhydride, etc. Compounds of formulas I and II can be employed as curing agents for epoxy resins, polyester resins, polyimide chain terminators, hydrocarbon grease antioxidants, etc.

Included by the nitro- or halo-aromatic anhydrides of formula IV are 3-nitrophthalic anhydride, 4-nitrophthalic anhydride, 3-chlorophthalic anhydride, 4-chlorophthalic anhydride, 3-fluorophthalic anhydride, 4-fluorophthalic anhydride, 3-bromophthalic anhydride, 4-bromophthalic anhydride, 3-iodophthalic anhydride, 4-iodophthalic anhydride.

Included by the nitro- or halo-aromatic anhydride of formula V are 4-nitronaphthalic anhydride, 2-nitronaphthalic anhydride, 4-chloronaphthalic anhydride, 2-chloronaphthalic anhydride, 4 - fluoronaphthalic anhydride, 2-fluoronaphthalic anhydride, 4-bromonaphthalic anhydride, 2-bromonaphthalic anhydride, 4-iodonaphthalic anhydride, 2-iodonaphthalic anhydride, etc.

In the practice of the invention reaction is effected between the alkali metal phenoxide or thiophenoxide, hereinafter referred to as the "phenoxide," or "thiophenoxide," respectively, and the nitro- or halo-substituted aromatic anhydride, hereinafter referred to as the "nitro or halo anhydride." The resulting aromatic ether or thioether anhydride, referred to hereinafter respectively as "ether anhydride," is thereafter received.

There can be employed from 1 to 3 moles of phenoxide, per mole of ether anhydride. Temperature of from 5° C. to 150° C., and preferable from 25° C. to 60° C. can be employed. The phenoxide or thiophenoxide is preferably employed as a preformed mixture of an aqueous alkali hydroxide, phenol or thiophenol and a mixture of organic solvents. Water of reaction can be removed while the mixture is refluxed and stirred under nitrogen. Organic solvents which can be employed are, for example, benzene, toluene, xylene, cyclohexane or mixtures of these solvents with dipolar aprotic solvents such as dimethylsulfoxide, dimethylformamide, etc.

It has been found that reaction between the phenoxide and ether anhydride can be facilitated by the employment of an organic solvent, such as dimethylsulfoxide, dimethylformamide, dimethylacetamide, hexamethylphosphoric triamide, sulfolane, etc.

Recovery of ether or thioether anhydride can be achieved by pouring the mixture into a precipitating solvent such as water, methanol, etc.

In order that those skilled in the art will be better able to practice the invention the following examples are given by way of illustration and not by way of limitation. All parts are by weight.

EXAMPLE 1

A mixture of 0.281 parts of 49.4% aqueous sodium hydroxide solution, 0.329 parts of phenol, about 15 parts of dimethylformamide and about 20 parts of benzene was stirred under nitrogen at reflux. The mixture was refluxed for about 3 hours during which time water was removed and thereafter benzene was distilled off.

There was added to the above preformed sodium phenoxide mixture at room temperature, 0.85 parts of 4-nitro-1,8-naphthalic anhydride followed by about 10 parts of dimethylformamide. After 5 minutes, the VPC showed that the reaction mixture had none of the original starting material. The mixture was then poured into about 150 pars of distilled water. There was obtained a precipitate which was recovered and washed with water. After it was air dried there was obtained 80% yield of product having a melting point of 179–180° C. Based on method of preparation and its infrared spectrum, the product was 4-phenoxy-1,8-naphthalic anhydride.

There is added the above ether anhydride to a condensate of the diglycidylether of bisphenol-A to produce a curable epoxy resin mixture having an effective amount of the above ether anhydride based on the weight of the mixture. The epoxy resin has an average molecular weight of about 340 and a viscosity of about 50 to 150 centipoises and the epoxide equivalent of about 175–210. The mixture requires several hours to cure. A rigid solid is formed showing that the ether anhydride curing agent can be employed to produce a curable resinous mixture having a variety of applications such as an adhesive, encapsulating resin, etc.

EXAMPLE 2

A preformed sodium thiophenoxide was made from 0.80 parts of a 49.4% aqueous sodium hydroxide solution, 0.10 parts of thiophenol, about 20 parts of dimethyl sulfoxide and about 30 parts of benzene utilizing the procedure described above. There was added to the above preformed sodium thiophenoxide at room temperature, 1.93 parts of 3-nitrophthalic anhydride dissolved in about 10 parts of dimethyl sulfoxide. An immediate reaction was noted based on the resulting dark red-brown color. After 15 minutes, about 40 parts of a 10% solution of sodium hydroxide was added and the resulting mixture was refluxed for 1½ hours. When the mixture had cooled to room temperature, the aqueous phase was extracted with ether and acidified with hydrochloric acid, and further extracted with ether. A crude product was obtained which was refluxed for 3 hours with about 25 parts of glacial acetic acid and about 2 parts of acetic anhydride. After cooling the solution was concentrated and the solid was triturated with hexane. There was obtained greater than an 80% yield of product. Based on method of preparation and VPC analysis, the product was 3-thiophenoxyphthalic anhydride.

EXAMPLE 3

A mixture of 0.798 parts of potassium tert-butoxide and 0.78 parts of thiophenol were stirred in dimethylformamide at 25° C. for one hour. There was then added 1.73 parts of 4-nitro-1,8-naphthalic anhydride to the mixture. The mixture turned from a slightly yellow color to a bright orange. After stirring the mixture for 10 minutes, there was no indication that any of the original starting material was present based on VPC analysis. There was obtained about an 80% yield of a bright yellow product. Based on method of preparation and infrared spectra, the product was 4-thiophenoxy-1,8-naphthalic anhydride.

A mixture of 100 moles of 2,2-bis[4-(3,4-dicarboxyphenoxy)phenyl]propane dianhydride, 105 moles oxydianiline and 10 moles of 4-thiophenoxynaphthalic anhydride are placed in a polymerization apparatus equipped with a screw blade stirrer, a nitrogen inlet and a side arm. The mixture is heated with stirring under nitrogen for 45 minutes at 280° C. The polymer is cooled to room temperature, dissolved in dimethylacetamide and the solution is filtered. The polymer is precipitated by pouring the filtrate into water. In this manner a 95% yield of polymer is collected which has an intrinsic viscosity of 0.35 dl./g.

EXAMPLE 4

A mixture of 1 part of sodium phenoxide, 1.43 parts of 3-fluorophthalic anhydride and 18 parts of anhydrous dimethylformamide were mixed at room temperature under a nitrogen atmosphere. The reaction mixture was quickly placed in a bath at 170° C. and the solution was stirred at reflux for 20 minutes. The mixture was cooled and added to 180 parts of 1.2N HCl mixed with ice, and the resulting white precipitate was collected and dried. In this manner, 1.65 parts (80% yield) of 3-phenoxyphthalic anhydride, m.p. 103–105° C., was obtained. This material was identified from its infrared and proton and carbon NMR spectra.

A mixture of 100 moles of 2,2-bis[4-(2,3-dicarboxyphenoxy)phenyl]propane dianhydride, 105 moles of methylene dianiline and 10 moles of 3-phenoxyphthalic anhydride were heated in the melt at 270° C. for 1 hour under a nitrogen atmosphere. The polymer melt was cooled, dissolved in dimethylformamide and precipitated in water. The resulting white precipitate of polymer was collected and dried to give 90% yield of polymer with intrinsic viscosity of 0.34 dl./g.

EXAMPLE 5

A mixture of 1 part of sodium phenoxide, 1.58 parts of 3-chlorophthalic anhydride and 50 parts of anhydrous dimethylformamide were mixed at room temperature under a nitrogen atmosphere. The mixture was placed in an oil bath at 160° C. and refluxed for 6½ hours. After cooling to room temperature, sodium chloride was removed by filtration. The filtrate was added to 250 parts of 1.2N HCl mixed with ice. This mixture was extracted with chloroform and the chloroform extracts were dried and concentrated. The resulting material was refluxed for 3 hours with a mixture of acetic acid/acetic anhydride. There was obtained a 90% yield of product. The product was 3-phenoxyphthalic anhydride based on its VPC and method of preparation.

EXAMPLE 6

A mixture of 1 part of sodium thiocresoxide and 1.13 parts of 3-fluorophthalic anhydride were stirred with 12 parts of anhydrous dimethylformamide under a nitrogen atmospheric at room temperature for 1½ hours. The reaction mixture was poured onto 100 parts 1.2N HCl mixed with ice and the resulting pale yellow precipitate was collected and dried to give 1.73 parts (94% yield) of 3-thiocresoxyphthalic anhydride, m.p. 136.5–138° C. The identity of the product was confirmed from its infrared, and proton and carbon NMR spectra.

EXAMPLE 7

A mixture of 1 part of sodium thiocresoxide, 1.25 parts of 3-chlorophthalic anhydride and 14 parts of dimethylformamide were stirred under a nitrogen atmosphere at 60° C. for 1 hour. The reaction mixture was cooled to room temperature and added to 150 parts of 1.2N HCl mixed with ice. The resulting precipitate was collected and dried to give 1.72 parts (93%) of 3-thiocresoxyphthalic anhydride, m.p. 132–133.5° C. The product was identical to the compound of Example 6, based on its IR and NMR spectra.

EXAMPLE 8

A mixture of 1 part of sodium thiocresoxide, 1.25 parts of 4-chlorophthalic anhydride and 12 parts of anhydrous dimethylformamide was heated at 60° C. under a nitrogen atmosphere for 2 hours. The reaction mixture was cooled to room temperature and added to 120 parts of 1.2N HCl mixed with ice. There was obtained an 87% yield of a dark yellow precipitate after it was collected and dried. The product was 4-thiocresoxyphthalic anhydride, m.p. 119.5–121° C. The identity of the product was confirmed by its infrared and proton and carbon NMR spectra.

Although the above examples are limited to only a few of the very many aromatic ether anhydrides which can be provided by the present invention, it should be understood that compounds are included by formulas I and II. The method of making the subject aromatic ether anhydrides is also shown by the use of alkali metal phenoxides of formula III and compounds of formulas IV and V.

What I claim as new and desire to secure by Letters Patent of the United States is:

1. A method for making aromatic ether anhydrides of the formulas,

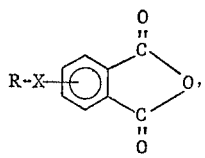

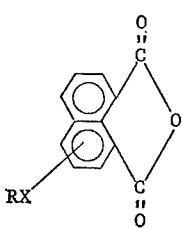

which comprises,
(1) effecting reaction between an alkali metal phenoxide of the formula

R—X—M, and a nitro- or halo-substituted aromatic anhydride selected from compounds of the formulas,

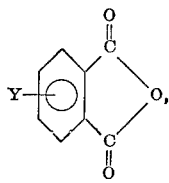

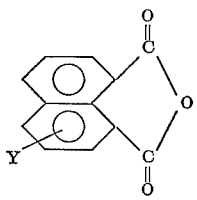

where Y can be nitro, chloro, fluoro, bromo, or iodo,
(2) and recovering from the resulting mixture of (1), an aromatic ether anhydride, where M is an ion of an alkali metal selected from sodium, potassium, lithium and rubidium, and R is an aromatic radical having from 6–13 carbon atoms selected from the class consisting of phenyl, tolyl, xylyl, naphthyl, anthryl, and halogenated derivatives thereof, and X is a divalent radical selected from —S— and —O—.

2. A method in accordance with claim 1 where the alkali metal phenoxide is sodium phenoxide.

3. A method in accordance with claim 1 where the nitro-substituted aromatic anhydride is 3-nitrophthalic anhydride.

4. A method in accordance with claim 1 where the nitro-substituted aromatic anhydride is 4-nitrophthalic anhydride.

5. A method in accordance with claim 1 where the halo-substituted aromatic anhydride is 3-chlorophthalic anhydride.

6. A method in accordance with claim 1 where the halo-substituted aromatic anhydride is 4-chlorophthalic anhydride.

7. A method in accordance with claim 1 where the halo-substituted aromatic anhydride is 3-fluorophthalic anhydride.

8. A method in accordance with claim 1 where the nitro-substituted aromatic anhydride is 4-nitro-1,8-naphthalic anhydride.

9. A method in accordance with claim 1 where the aromatic ether anhydride is 3-phenoxyphthalic anhydride.

10. A method in accordance with claim 1 where the aromatic ether anhydride is 3-thiophenoxyphthalic anhydride.

11. A method in accordance with claim 1 where the aromatic ether anhydride is 4-thiophenoxy-1,8-naphthalic anhydride.

12. Aromatic thioether anhydrides selected from the class consisting of

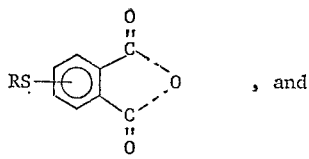 , and

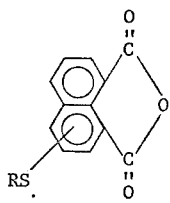

where R is an aromatic radical having from 6 to 13 carbon atoms selected from the class consisting of phenyl, tolyl, xylyl, naphthyl, anthryl, and halogenated derivatives thereof.

13. The compound 4-thiophenoxy-1,8-naphthalic anhydride, in accordance with claim 12.

14. The compound 3-thiophenoxyphthalic anhydride in accordance with claim 12.

15. The compound 3-thiocresoxyphthalic anhydride in accordance with claim 12.

16. The compound 4-thiocresoxyphthalic anhydride in accordance with claim 12.

17. The compound 4-phenoxy-1,8-naphthalic anhydride in accordance with claim 12.

18. The compound 3-phenoxyphthalic anhydride in accordance with claim 12.

19. The compound 4-phenoxyphthalic anhydride in accordance with claim 12.

References Cited

UNITED STATES PATENTS 3,519,652   7/1970   Fitzmaurice et al. __ 260—345.2

JOHN M. FORD, Primary Examiner

U.S. Cl. X.R.

252—407; 260—29.1 R, 346.3